R. F. STEWART.
TRUCK LOADING AND UNLOADING MECHANISM.
APPLICATION FILED MAR. 6, 1920.
1,423,887.
Patented July 25, 1922.
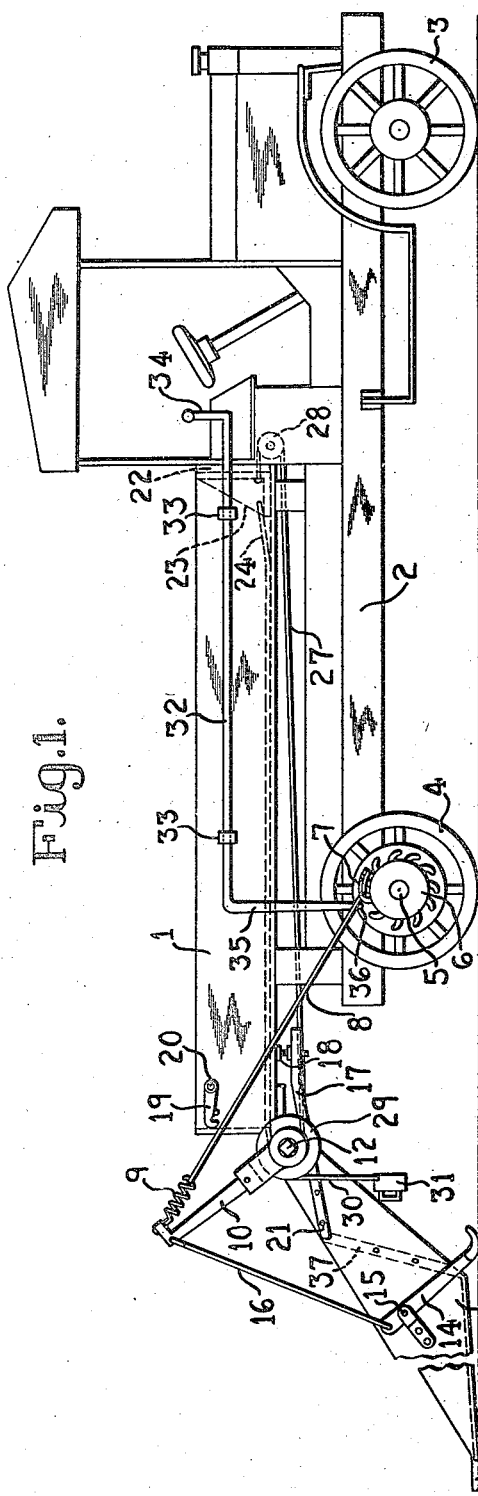
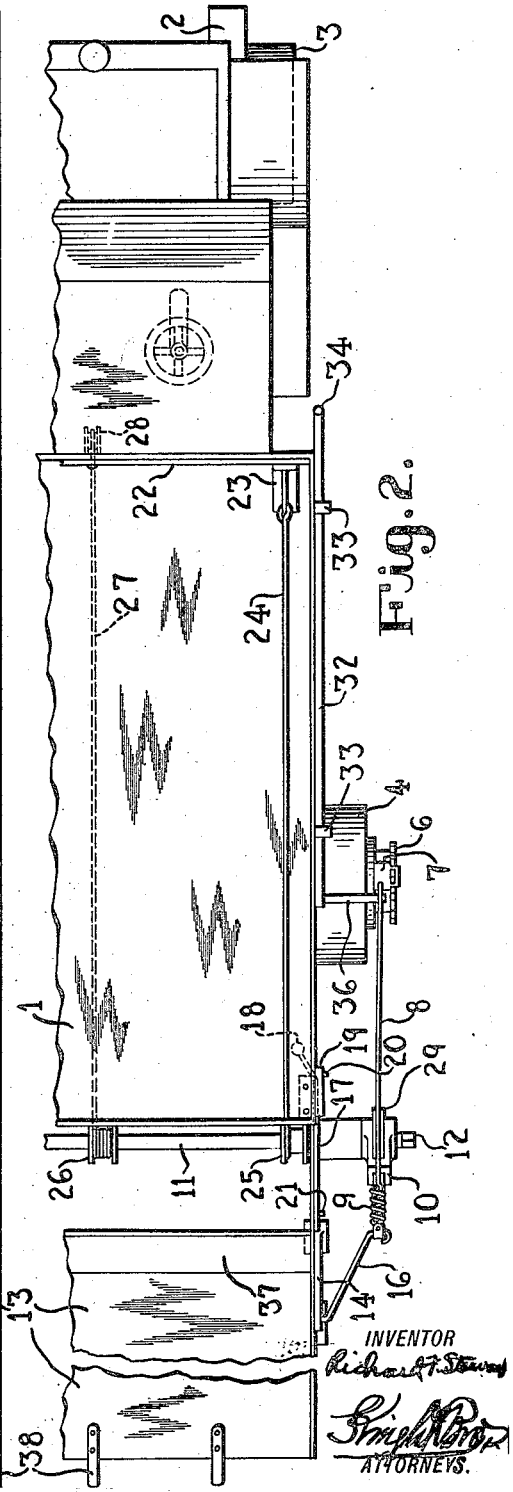
INVENTOR
Richard F. Stewart
ATTORNEYS.

UNITED STATES PATENT OFFICE.

RICHARD F. STEWART, OF BRIARCLIFF, NEW YORK.

TRUCK LOADING AND UNLOADING MECHANISM.

1,423,887.  Specification of Letters Patent.  Patented July 25, 1922.

Application filed March 6, 1920. Serial No. 363,739.

*To all whom it may concern:*

Be it known that I, RICHARD F. STEWART, a citizen of the United States, residing at Briarcliff, county of Westchester, and State of New York, have invented certain new and useful Improvements in Truck Loading and Unloading Mechanism, of which the following is a specification.

This invention relates to loading devices for vehicles and has for its primary object to provide an improved device of this character which can be operated by the movement of the vehicle, or which in a motor driven vehicle, can be driven by the motive power which propels the vehicle. Certain specific objects of invention will appear in the specification and be pointed out in the appended claims, reference being had to the accompanying drawings which exemplify my invention in a preferred embodiment.

In the drawings:—

Figure 1 is a side elevation of a motor driven vehicle provided with my improved loading device and cooperating load discharging means, portions of the excavating scoop being broken away;

Figure 2 is a top plan view of one side of the same, parts being broken away.

Referring more particularly to the drawings, in the present embodiment of my invention, the vehicle body 1 is mounted on a suitable frame 2 provided with forward wheels 3 and rear wheels 4. Said rear wheels 4 are mounted on a shaft or shaft sections 5 which, according to the present embodiment are driven by the automobile engine through the differential. Preferably keyed to each power driven shaft section 5, is a wheel or claw sprocket 6 with which is adapted to engage a link 7 on the end of a flexible member 8. Adjacent its other end, said flexible member 8 includes a yieldable portion preferably in the form of a spring 9. At its upper end, the flexible member 8 on each side of the vehicle, is connected to the outer end of a lever arm 10 which is freely pivoted on a transverse shaft 11. According to the present embodiment of my invention, the loading device comprises an excavating scoop 13 which is pivotally mounted on the shaft 11 by means of the side plates of said scoop which are extended for this purpose. Pivotally mounted on the oppositely arranged side plates of the scoop 13, are levers 14 (only one of which is shown), said levers being provided with curved lower ends to adapt them to rock thereon as the initial lifting movement is imparted to the scoop by means of power applied at the upper ends of lever arms 10. Each of the levers 14 are pivoted at 15 on a side plate of the scoop and has its upper end connected by a rod 16 to the outer end of one of the lever arms 10. Suitable means for limiting the downward displacement of the scoop 13 with respect to the vehicle, may be provided by bars 17 which are preferably rigidly secured to the side plates of said scoop. In the forward ends of these side bars are mounted adjustable abutments 18 which may be threaded into said bars so as to vary the lowermost position of the scoop with respect to the vehicle. A latch 19 which is pivoted at 20, is adapted to lock the scoop in raised position by releasably engaging a pin 21 which projects laterally from the side plate of the scoop 13. Means for discharging the load may be provided by means of a pusher or follower in the form of a board 22 which is mounted on brackets 23. On each side of the vehicle extends a rope or cable 24 which is connected at one end to the bracket 23 on that side and at its other end is wound upon a spool or drum 25 which is keyed to the shaft 11. It will be seen that by applying a crank (not shown) to the squared end 12 of the shaft 11, the follower 22 may be drawn rearwardly to displace the load. Also keyed to the shaft 11 is a second spool or drum 26 upon which is wound in a reverse direction the rear end of a second rope or cable 27 which passes about a pulley 28 at the forward end of the vehicle body and is secured to the follower 22. From this description, it will be seen that the follower is returned to loading position by a clockwise rotation of the shaft 11. In order to apply power to the unloading operation, a pulley 29 may be keyed to the shaft 11 in the forked hub of the lever arm 10. Upon this pulley is wound a rope 30 provided on its outer end with a link 31 which is adapted to be engaged by the claw sprocket 6. Suitable means for releasing the link 31 or link 7 from engagement with the claw sprocket 6, may be provided by a rod 32 which is oscillatably mounted in lugs 33 on the vehicle body. Said rod is provided with a handle 34 which is accessible from the seat of the vehicle and carries at its opposite end a depending arm 35 from which projects laterally a pin 36 which fits under the link 7 or link 31 as the case may be. It will be understood that with the parts in their relative positions shown in the drawings, when the vehicle is caused to move forward, the excavating scoop 13 which has just been charged with material, moves forwardly and upwardly on the rocking levers 14 which bear on the ground by means of their curved feet and are thus moved forwardly as they lift the scoop from the ground. As shown in dotted lines in Figure 1, the scoop is provided with an inclined wall 37 over which the excavated material discharges when the scoop has been raised into upright position. It will be understood that in this position of the scoop, the open edge of wall 37 will be raised above the tail board of the vehicle body and hence the scoop discharges over the tail board into the vehicle. Suitable means for adapting the scoop to loosen the material to be excavated, may be provided in the form of protruding points or picks 38 which are driven into the material by backing the vehicle.

I claim:—

1. The combination with a motor driven vehicle, of a scoop pivotally mounted thereon, and power driven means for moving said scoop on its pivotal axis from excavating position to a position in which the excavated material is dumped into said vehicle, said scoop moving means embodying ground engaging levers for initiating the raising of the scoop.

2. The combination with a motor driven vehicle provided with a driving wheel, having a sprocket secured thereto of a loading device movably connected to said vehicle, and means for operatably connecting said loading device to said sprocket for moving it from excavating position to dumping position, said means embodying a flexible member engageable with said sprocket.

3. The combination with a motor driven vehicle provided with a driving wheel, of a loading device movably connected to said vehicle, and means for operatably connecting said loading device to said wheel for moving it from excavating position to dumping position, said connecting means including a lever arm movable about an axis and connected to said loading device, means for initiating the raising of said loading device and means for detachably connecting said lever arm to said driving wheel.

4. The combination with a vehicle provided with a wheel, of a claw sprocket secured to said wheel, an excavating device mounted on said vehicle, a lever arm connected to said excavating device, and means for detachably connecting said lever arm to said claw sprocket.

5. The combination with a vehicle provided with wheels of a scoop movably connected thereto, a lever mounted on said scoop and having one end adapted to bear on the ground, and means for detachably connecting said lever to a wheel of said vehicle.

6. The combination with a vehicle provided with wheels, of a scoop movably connected thereto, a lever mounted on said scoop and having one end adapted to bear on the ground, and means for detachably connecting said lever to a wheel of said vehicle, said connecting means including a lever arm pivoted on said vehicle, means for connecting said levers, and a flexible connection between the second mentioned lever and said wheel.

7. The combination with a motor driven vehicle, of a scoop pivotally mounted thereon to swing from excavating position to dumping position, a lever pivotally mounted on said scoop and adapted to rock on the ground for initially raising said scoop, a second lever coaxially pivoted with said scoop, means for connecting said levers, a power driven claw sprocket wheel, and a flexible member connected to the second mentioned lever and provided with a link adapted to detachably engage said claw sprocket.

8. The combination with a vehicle of a discharging means and operating mechanism therefor, said mechanism comprising a shaft journalled on said vehicle, a discharging element operatively connected to said shaft, a power driven traction wheel and means connecting said shaft to said power driven traction wheel for rotating said shaft, said means including a drum fixed on said shaft and flexible means associated with said drum and adapted to be connected to said traction wheel.

9. The combination with a vehicle provided with a power driven traction wheel having a claw wheel connected thereto of a loading device and an unloading device, means including a disengageable flexible member for operatively connecting said loading device to said claw wheel and means including a disengageable flexible member for operatively connecting said unloading device to said claw wheel.

10. An arrangement of the class described comprising a vehicle provided with a power driven traction wheel, a loading device associated with said vehicle, means for detachably connecting said loading device to said power driven traction wheel for operating said loading device, an unloading device and means for detachably connecting said unloading device to said power driven traction wheel for operating said unloading device.

RICHARD F. STEWART.